United States Patent [19]

Rose

[11] Patent Number: 5,608,411
[45] Date of Patent: Mar. 4, 1997

[54] APPARATUS FOR MEASURING A SPATIAL ANGLE TO AN EMITTER USING SQUINTED ANTENNAS

[75] Inventor: Conrad M. Rose, Dahlgren, Va.

[73] Assignee: Litton Systems, Inc., Woodland Hills, Calif.

[21] Appl. No.: 480,906

[22] Filed: Jun. 9, 1995

[51] Int. Cl.$^6$ ................... G01S 5/02; G01S 5/04; H01Q 21/06

[52] U.S. Cl. .............. 342/417; 342/362; 342/432; 342/442

[58] Field of Search .................. 342/362, 417, 342/432, 442

[56] References Cited

U.S. PATENT DOCUMENTS 3,824,595  7/1974  Hall ........................... 342/432
5,541,608  7/1996  Murphy et al. ............... 342/442

*Primary Examiner*—Gregory C. Issing
*Attorney, Agent, or Firm*—Gerald L. Lett

[57] ABSTRACT

An apparatus for determining a spatial angular reference to an emitter of RF signals, such as direction of arrival or angle of arrival, from phase measurements made between two antennas is described. The apparatus uses at least a pair of dual polarized antennas having non-parallel boresights. Like polarized outputs from the antennas produce phase information which is stored and then summed to remove bias error in favor of the sin (AOA) component, while the phase information from the like polarized antennas is also differenced producing a signal indicative of the bias error. It is shown that the bias error can be uniquely related to emitter angle and azimuth. The latter information is obtained without the need for making emitter frequency measurements.

4 Claims, 7 Drawing Sheets

FIG. 5a  Computed Phase Bias: 45 Degree Squint

FIG. 5b  Computed Phase Bias: 90 Degree Squint

FIG. 6

APPARATUS FOR MEASURING A SPATIAL ANGLE TO AN EMITTER USING SQUINTED ANTENNAS

BACKGROUND OF THE INVENTION

This invention relates to direction finding (DF) of remote radio frequency (RF) emitters using phase measurements made between pairs of antennas. More particularly, the invention relates to apparatus for measuring the direction of arrival (DOA) of a RF planer wave front utilizing phase bias error developed between elliptically polarized antennas which have non-parallel boresights, or which are "squinted".

The prior art teaches that there are two known methods of emitter angular location. These are commonly referred to as the amplitude DF and phase interferometer DF techniques.

A conventional approach for amplitude direction finding is to use pairs of antennas whose boresights are squinted, or offset, at an angle from each other. The system measures the relative power received by the two antennas, and, by knowing the antenna amplitude response, determines the emitter's angular location. Since the amplitude response varies with emitter polarization, and amplitude comparison accuracy is a strong function of the signal to noise power ratio (SNR), this technique is intrinsically inaccurate. It is generally not suitable for generating precision angle measurements required in bearings-only passive location. However, an advantage of amplitude systems of this type is that the squinted antenna pair may be located at any distance from one another, e.g., on different wingtips of an airframe. Because of this simplicity, amplitude DF systems are typically used on many aircraft as part of the radar warning system (RWR).

By contrast, interferometer systems measuring phase rather than amplitude between pairs of antennas generate emitter DF more accurately than amplitude systems, but these systems are more complex. In an interferometer, the antenna pair placement must be very precise to resolve the angle of arrival (AOA) ambiguities. Also, multiple antenna pairs are typically required to perform this ambiguity resolution.

In commonly assigned U.S. Pat. No. 5,343,212 there is described a passive emitter location technique that can use the phase measured across RWR amplitude DF antenna pairs. Thus, this technique obtains some of the advantage of an interferometer system, but can utilize elements of existing amplitude systems without requiring multiple antennas. However, this method uses signal processing techniques based on partitioning the emitter azimuth from the observer to the radar horizon. This partitioning results in many estimators that must be implemented in software. When the aircraft is at significant altitude above ground, the number of partition enhanced estimators required can be very large.

It is therefore an object of the invention to provide apparatus for generating AOA or DOA information which takes advantage of the relative simplicity of an amplitude DF system having squinted antennas but in fact uses the phase bias induced by the squinting antennas.

Another object of the invention is to provide apparatus capable of making such measurements without requiting emitter frequency measurements.

SUMMARY OF THE INVENTION

The foregoing and other objects are realized utilizing squinted antenna elements as might be employed in an existing amplitude DF system. It uses the phase bias between these antenna elements induced by the squint, rather than the phase difference due to the separate antenna phase centers as in a conventional interferometer to produce an unambiguous angle measurement in a single dwell. In utilizing the principles of the invention, multiple antennas are not required to resolve phase ambiguities no matter what the antenna spacings are, nor are multiple dwells required to produce an unambiguous target angle. The emitter angle measured in the system according to the invention is normal to the plane containing the antenna boresights. Hence, in a typical RWR system with wing mounted amplitude DF antennas, this invention provides a means to measure emitter elevation from AOA phase measurements. Thus, it can be used as an adjunct to the method of U.S. Pat. No. 5,343,212 to limit the number of range partitions required, or independently to provide an emitter elevation for use in a conventional azimuth/elevation ranging. It can also be used as the bases for new DF systems generating unambiguous DOA from phase measurements made between pairs of antennas an arbitrary distance apart. Emitter frequency measurements, such as are required for conventional phase measurements, would not be required in some interferometer measurements, implementations of this invention to generate DF.

BRIEF DESCRIPTION OF THE DRAWINGS

The principles of the invention will be more readily understood by reference to the description of prior art embodiments and preferred embodiments constructed according to the principles of the invention as more clearly illustrated in the drawings which are briefly described below.

DETAILED DESCRIPTION OF THE DRAWINGS

Figure 1:
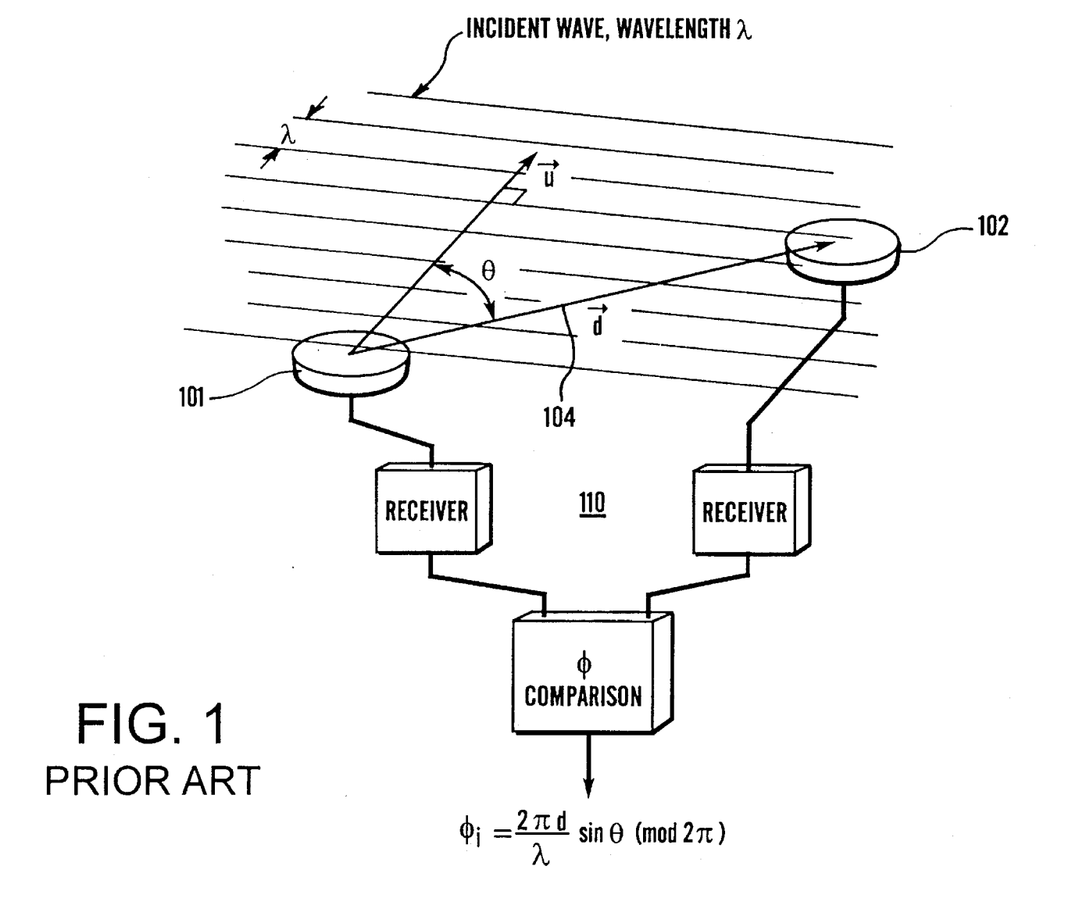
FIG. 1 is a schematic view illustrating the basic elements of prior art interferometer used for measuring the phase difference of a plane wave signal with spiral mode antennas.

FIG. 1 illustrates the basic elements of a rudimentary interferometer array 110 which measures the relative phases received by antennas 101 and 102 along baseline 104. The antennas 101 and 102 are elliptically polarized, and in particular, spiral mode antennas. Accordingly, great care is taken to assure all antenna elements are boresighted and phase referenced or "clocked".

Figure 2:
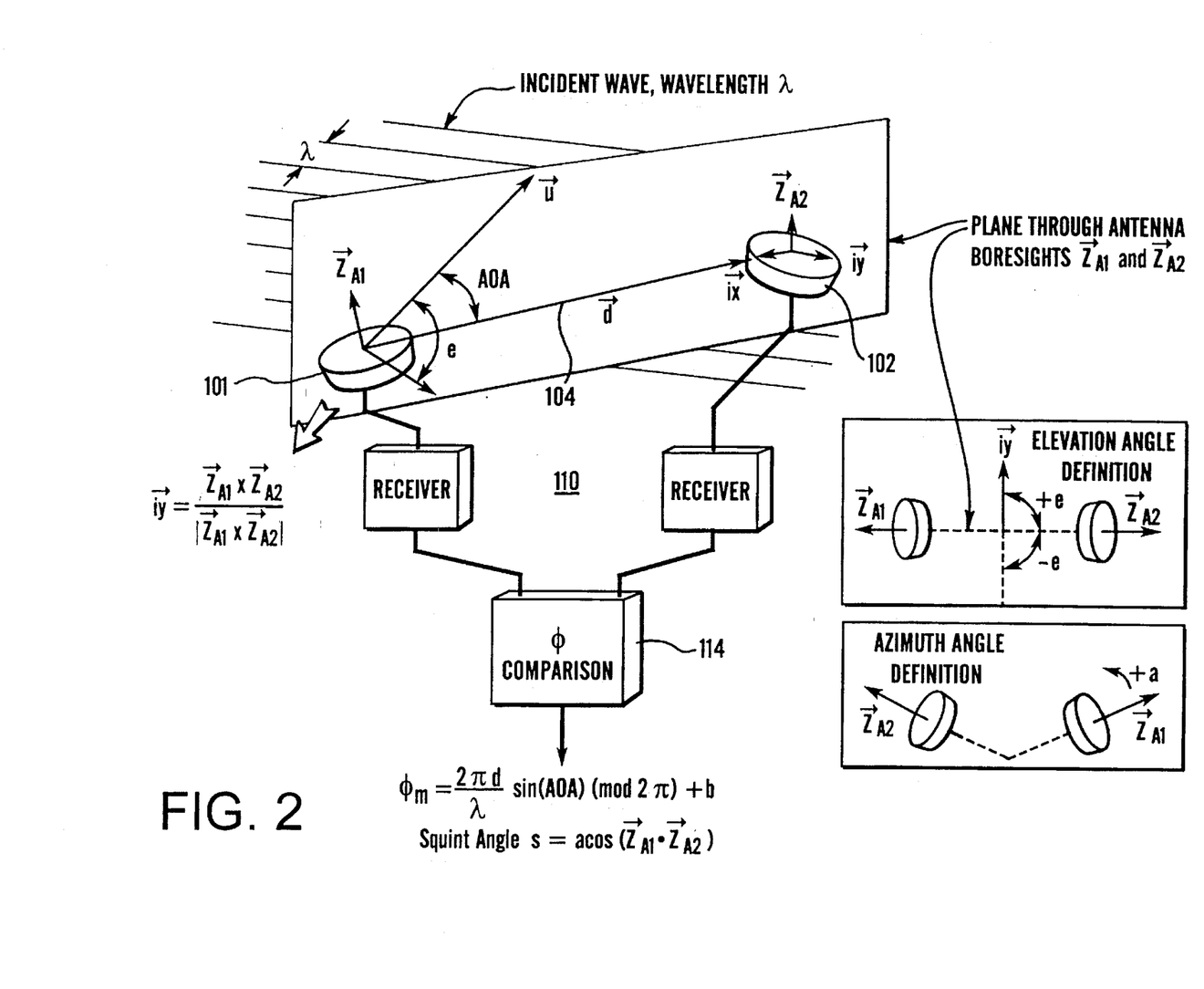
FIG. 2 is a schematic view of the FIG. 1 prior art system illustrating that squinting antennas introduce a bias in the phase measurement that is proportional to both the squint angle s and emitter elevation e; reference should be had to this figure, as well, in that it defines the quantities used herein below in describing the invention.

FIG. 2 illustrates the same system 110 wherein the antenna elements 101 and 102 are squinted, but the phase measurements are made along the same baseline 104. As is clear from FIG. 2, a bias term appears in the phase measurement produced by phase comparator 114. This bias which represents an error in the conventional system is of prime importance in connection with the invention described herein. FIG. 2 also provides related diagrams which pictorially define the quantities used herein in describing the invention.

The squint induced bias term is zero for emitters located in the plane of the antenna boresights, and obeys the sign relationship shown in table I below for emitters outside of this plane. This out of plane angle will be referred to as emitter elevation in the following discussion. (See FIG. 2 for angle and sign definitions). Table I indicates that the sign of the bias also depends on the antenna polarization. The antennas are assumed to be either both right handed circularly polarized (RHCP) or both left hand circularly polarized (LHCP) when making the phase measurement.

TABLE I

Sign on phase error as a function of angle with respect to the boresight plane (elevation) and antenna polarization.

| Antenna-pair Polarization | +elevation | −elevation |
| --- | --- | --- |
| LHCP | − | + |
| RHCP | + | − |

The magnitude of the bias due to squint is related to emitter elevation by a theoretical relationship that is one to one over ±90 degree elevation azimuth angles of interest. This invention uses this unique relationship between elevation angle and phase bias to obtain an estimate of the emitter elevation from the biased and possible AOA ambiguous phase measurement.

Referring to FIG. 2 for notation definition, squinted spiral mode antennas generate a phase bias whose magnitude is represented by the following equation:

$$b = \arccos\left(\frac{(\vec{u} \times \vec{z}_{A_1})}{|\vec{u} \times \vec{z}_{A_1}|} \cdot \frac{(\vec{u} \times \vec{z}_{A_1})}{|\vec{u} \times \vec{z}_{A_2}|}\right) - \qquad (1)$$

$$\arccos\left(\frac{(\vec{z}_{A_1} \times \vec{u})}{|\vec{z}_{A_1} \times \vec{u}|} \cdot \frac{(\vec{z}_{A_1} \times R_y(2s)\vec{u})}{|\vec{z}_{A_1} \times R_y(2s)\vec{u}|}\right)$$

In this equation, $R_y(2s)$ is the matrix that rotates vectors through the angle $2s$ about the $i_y$ axis of FIG. 2.

The first term in this equation is the phase bias induced by antenna polarization response, while the second term is due to the shift of the antenna spiral mode phase reference, or "clock". The polarization phase difference and clock phase difference vary the same way: both have maxima and minima at the same azimuths. As shown in table I above the sign of the bias, b, depends on antenna polarization. Equation 1 is for a LHCP antenna pair.

For a proper understanding of this invention, it should be understood that certain aspects of squinted spiral mode antennas are key to this invention, and these principles may be summarized as follows:

a. antenna squint induces a phase bias accurately described by equation 1;

b. the bias is proportional to the emitter elevation angle, where elevation is defined according to FIG. 2;

c. for a given emitter elevation, the phase bias induced by squint does not vary much with emitter azimuth where azimuth is defined according to FIG. 2;

d. phase bias changes sign when phase measurements are made with two LHCP antennas compared to when it is made with two RHCP antennas;

e. for phase measurements made between two LHCP and RHCP antennas, the phase bias changes sign when the elevation angle passes through the plane defined by the antenna boresights; and f. the relation of this bias to elevation is not phase ambiguous, no matter how far apart the antenna phase centers may be, i.e., no matter how ambiguous is the sin (AOA) component of the phase measurement.

Figure 3:
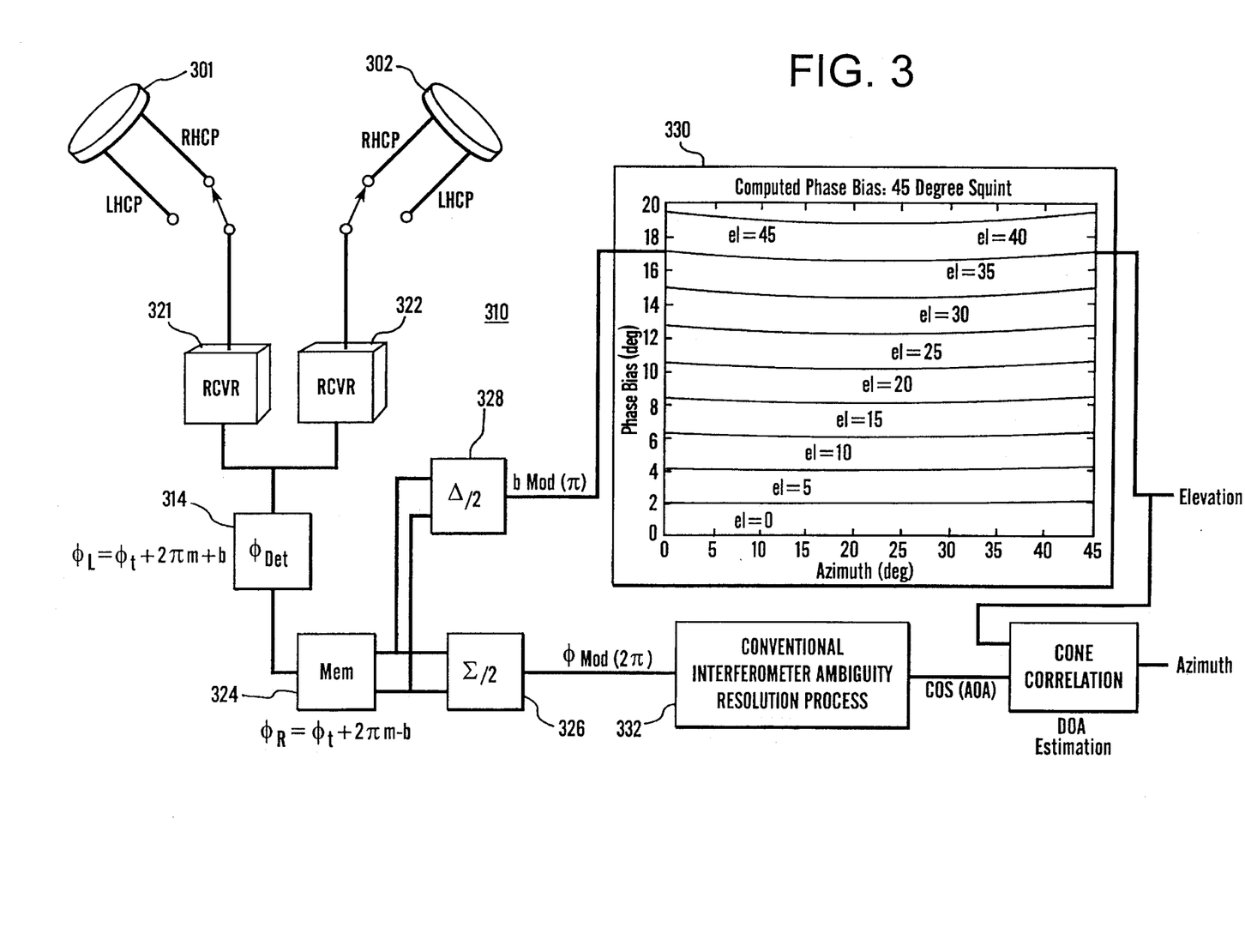
FIG. 3 is a schematic view of a first embodiment of a system constructed according to the principles of the invention using two sets of measurements made by different antenna polarizations.

FIG. 3 illustrates a system 310 which utilizes the basic elements of the phase bias to produce emitter DOA in three processes: bias measurement, angle extraction from bias and DOA estimation. The system 310 uses two orthogonally polarized squinted antennas 301 and 302 where both are switched to the same polarization and then both switched to an alternate polarization mode and phase measured again by the receivers 321 and 322 and phase detector 314. The phases so measured are stored in memory 324 until the phase measurement process is complete. The two phase measurements are then added together to remove the bias error in summing component 326. The bias cancels because of the bias sign change that occurs when the antenna polarization is switched.

Figure 5A:
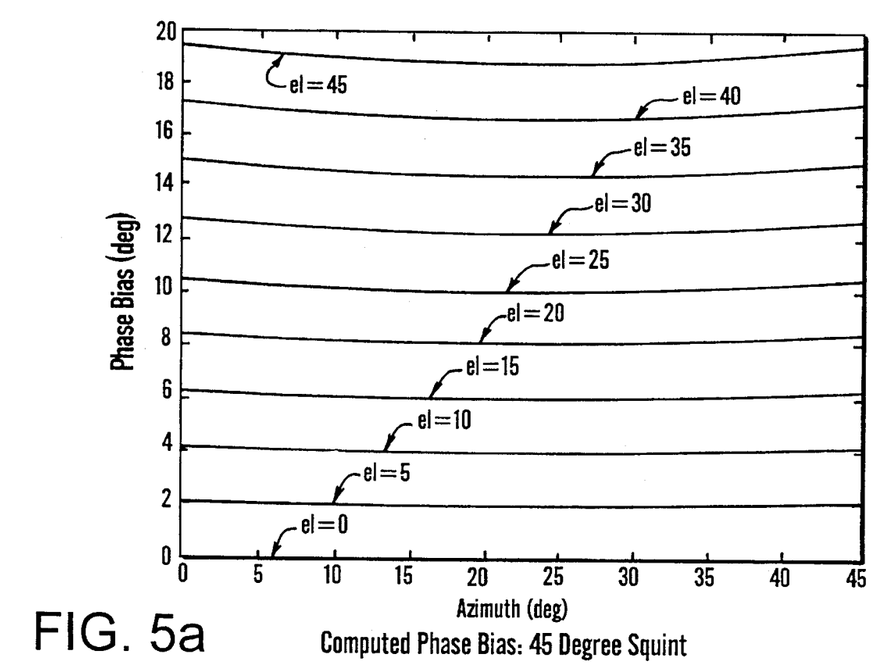
FIG. 5a is a chart showing the relation between antenna squint induced phase bias and the emitter elevation (el) and azimuth for a 45 degree squint angle.
Figure 5B:
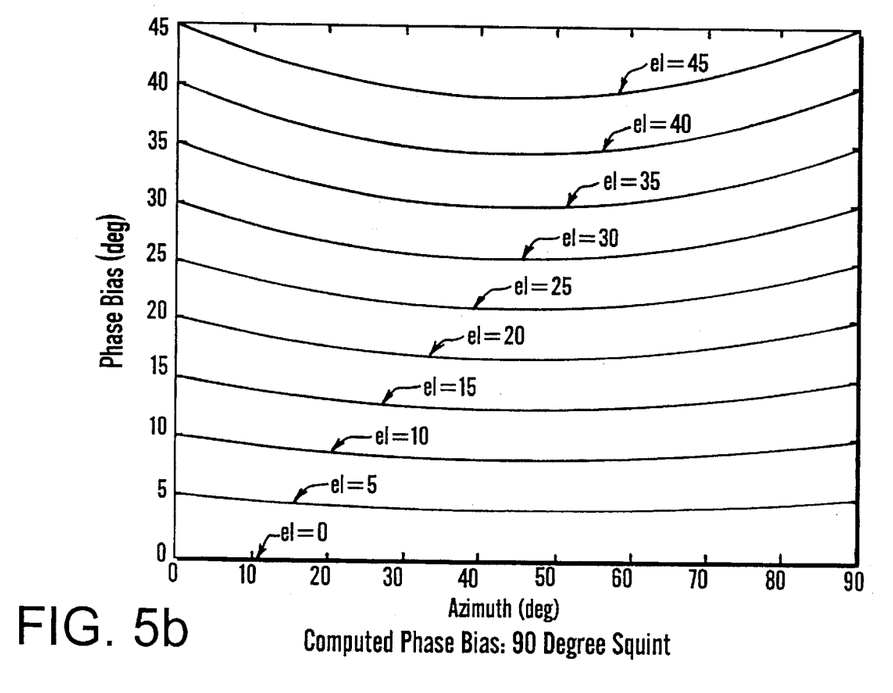
FIG. 5b is a similar chart to that in FIG. 5 showing the relation between antenna squint induced phase bias and emitter elevation and azimuth for a 90 degree squint angle.

Similarly, when the phase measurements for right hand and left hand polarization are differenced at 328 the sin (AOA) component of the phase cancels leaving only the bias induced by the antenna squint. The bias is always determined unambiguously in this differencing process. The bias thus found is related to emitter elevation using the relation between elevation and bias quantified by equation 1 as illustrated below in FIG. 5. In system 310 the component 330 shows this process of relating bias to elevation. Clearly, if emitter azimuth is known, the elevation estimate can be refined in this process, but knowing emitter azimuth is not necessary because of the only slight dependence of phase bias on azimuth, as indicated by the solutions of equation 1 shown in FIG. 5.

Figure 6:
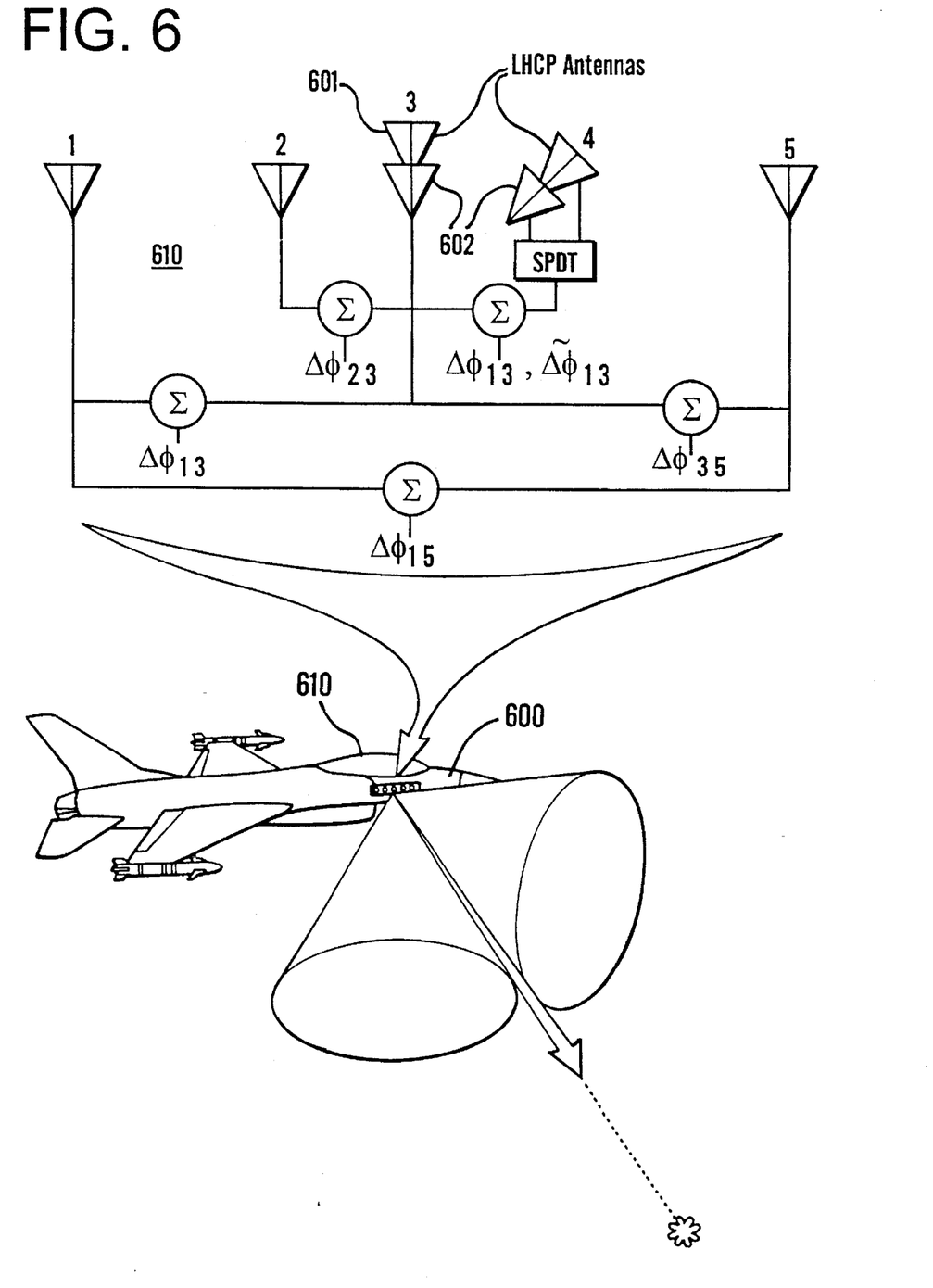
FIG. 6 is a schematic view of a conventional interferometer array modified according to the invention, as in FIG. 3 to generate emitter DOA.

Element 332 indicates that the ambiguous sin AOA component of the phase can be resolved if other phase measurements are available, for example, if this technique is used in a conventional interferometer implementation such as shown in FIG. 6 below.

Figure 4:
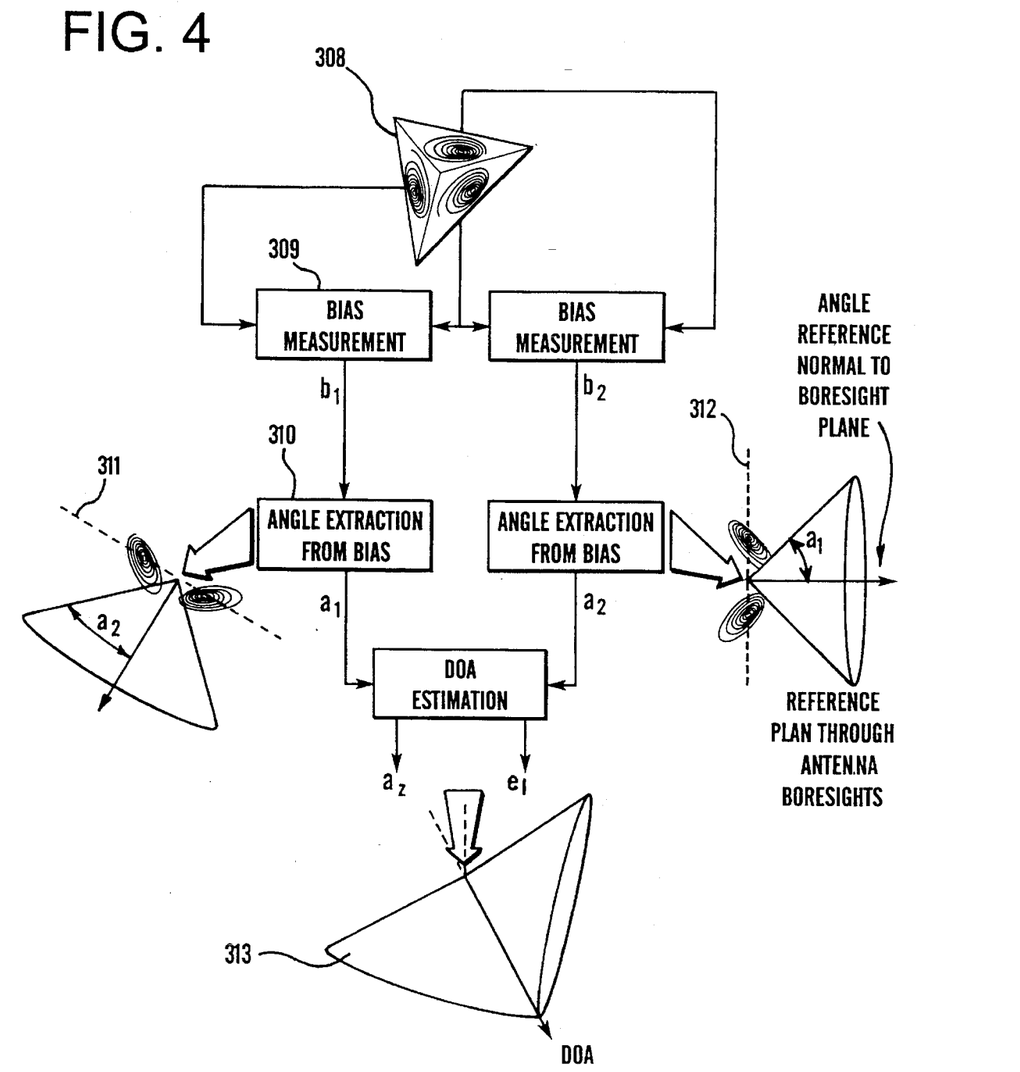
FIG. 4 is a second embodiment constructed according to the principals of the invention wherein a third antenna is combined with the FIG. 3 system to estimate an azimuth angle as well as an elevation angle.

In another implementation of the FIG. 3 system, shown schematically in FIG. 4, two separate phase bias measurements are used to obtain both emitter elevation and azimuth. Three squinted dual polarization antennas 308 allow two separate pairs of antennas to make two separate phase bias measurements according to the technique just outlined. Although these antennas are shown close together, this is not a necessary aspect of this invention. For instance, two antennas could be located on separate wingtips of an aircraft, and one antenna could be located on the aircraft tail. The bias measurement process figuratively illustrated at 309 consists of the phase measurement and differencing process described in conjunction with FIG. 3. The angle extraction figuratively illustrated at 310 was discussed above as well. In this case, referring to the angles found as elevation angles is too restrictive. Geometrically, these angles determine cones 311 and 312 which have axes normal to the antenna boresight plane. These cones are intersected at 313 to find the emitter DOA.

FIG. 5 provides a chart illustrating the computed phase bias for a 45 degree squint, and likewise, FIG. 5 provides similar information for a 90 degree squint. It is important to note from these figures that the bias error does not vary much with azimuth, but it does vary strongly with elevation. Thus, this property can be used to obtain elevation information without requiring any particular knowledge of azimuth.

FIG. 6 is illustrative of a practical application of the invention wherein emitter elevation and azimuth information are obtained from phase measurements made between antennas in a linear array.

An important aspect of this invention is the capability of obtaining emitter elevation and azimuth from phase measurements made between antennas in a linear array. In schematic form FIG. 6 illustrates such a linear array on an aircraft 600; the linear array 610 is depicted as being mounted on the aircraft's fuselage. In this figure, the conventional linear array 610 has been modified by substituting squinted dual polarization antennas 601 and 602 according to the principle of the invention. As is known from the prior art, DOA cannot usually be measured by a single linear array. Rather, non-collinear elements are provided as well, such as described in U.S. Pat. No. 4,638,320. FIG. 6, however, according to the invention, illustrates an implementation of the present invention that allows an existing linear interferometer to measure DOA. The linear array 610 includes a series of antenna locations 1 through 5. Dual LHCP and RHCP antennas 601 and 602 are provided at antenna locations 3 and 4 in the array. By boresighting antenna 601 with the other antennas in the array, except antenna 602, and squinting antennas 602 with respect to antenna 601, elevation and hence DOA is provided according to the invention.

Figure 7:
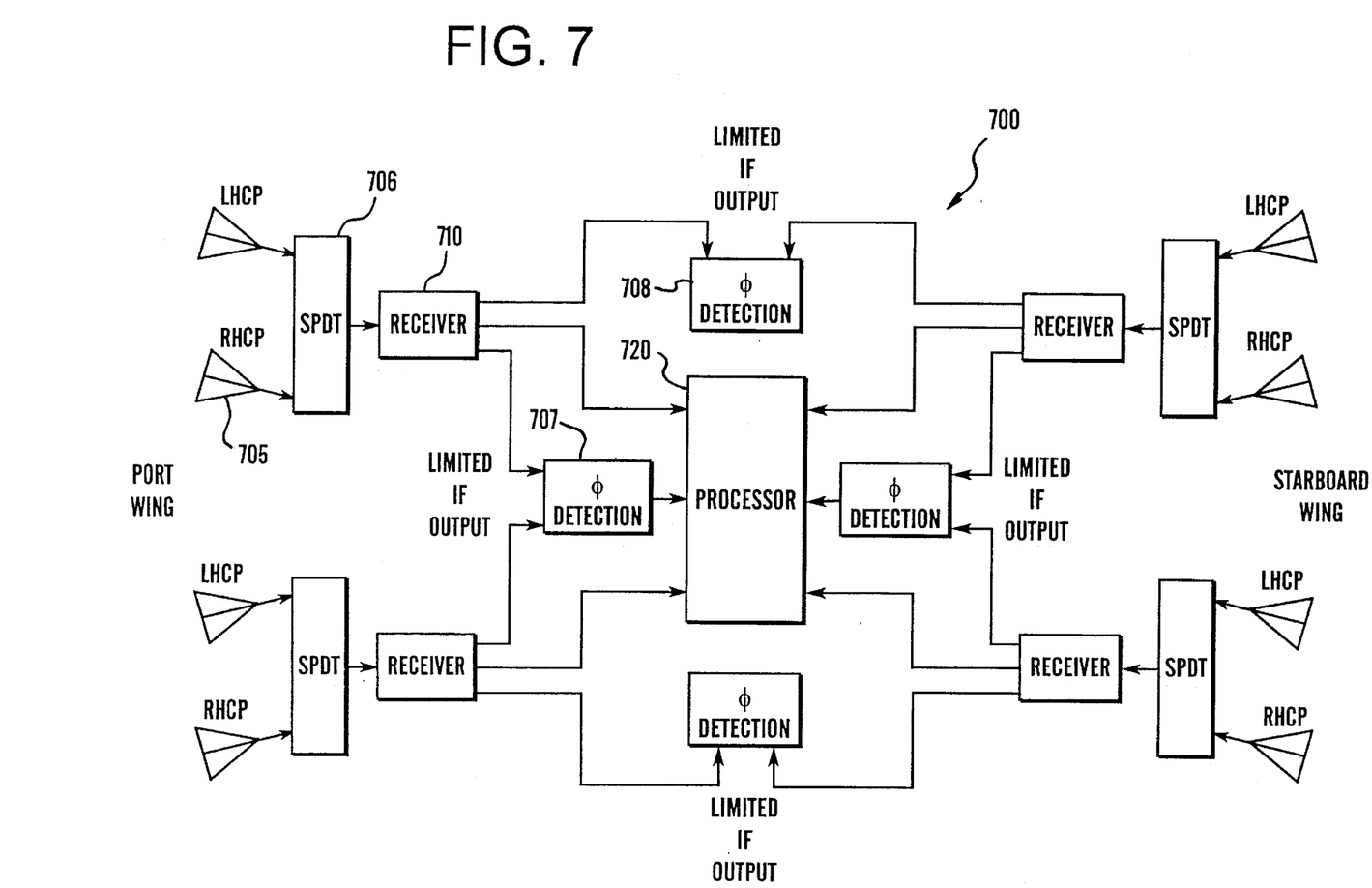
FIG. 7 is a fourth embodiment constructed according to the principles of the invention illustrating how a conventional radar warning system utilizes squinted antennas according to the invention to measure elevation.

Another important aspect of this invention is that it allows conversion of amplitude to spatial angle measurement systems to phase to spatial angle measurement systems without requiring additional antennas, or changing the antenna locations. FIG. 7 illustrates this aspect of the invention by showing a typical amplitude DF RWR system 700. Conventionally, such systems would have, respectively, two RHCP squinted antennas mounted on each of the port and starboard wings of an aircraft. According to the invention, each of these pairs of antennas are replaced by, respectively, dual polarized antennas as shown at location 705 in FIG. 7 which together feed spdt switch 706 which are, for this group of antennas, coupled through a receiver 710 to a phase detector 707 working off the limited IF output of the latter receiver. This information is provided to a processor 720 which according to the principles of the invention supplies precise unambiguous elevation information in the manner described hereinabove with respect to FIG. 3.

The foregoing descriptions of preferred embodiments are intended only to be illustrative of the principles of the invention. It is to be understood that the described embodiments can be modified or changed while remaining within the scope of the invention as defined by the appended claims.

I claim:

1. Apparatus for determining a spatial angular reference to an emitter of RF signals from phase measurements made between at least two antennas comprising:

a. at least a pair of dual polarized antennas having non-parallel, or "squinted", boresights for receiving an incident plane wave RF signal, b. a switch for selecting like-polarized outputs from each antenna of said pair, c. means for receiving and measuring the phases between like polarized outputs from said antennas as, respectively, first and second phase signals, d. a memory for storing respectively, the first and second phase signals, e. summing means for producing a third signal which is the sum of said first and second signals to thereby remove bias error, said third signal corresponding to the sin (AOA) component of the phase information determined by said means for receiving and measuring, f. differencing means for producing a fourth signal which corresponds to the difference between said first and second signals removing the sin (AOA) component of the received phase information leaving only bias error induced by antenna squint, g. processing means for estimating a spatial angle of the emitter from the value of said fourth signal, said spatial angle being referenced to a vector normal to a plane through the boresights of said antennas.

2. The apparatus defined in claim 1 wherein the direction of arrival (DOA) of the RF emitter signals is determined, wherein more than two of said antennas having non-parallel boresight planes are used and wherein said processing means determines emitter azimuth and elevation angle only from the value of said fourth signal.

3. The apparatus defined in claim 1 wherein the DOA of the RF emitter signals is determined and wherein said at least a pair of dual polarized antennas are located in an interferometer array of antennas further comprising:

interferometer ambiguity resolution means for producing from said fourth signal a fifth signal corresponding to another spatial angle to the emitter.

4. The apparatus defined in claim 3 wherein said fifth signal is combined in said processing means with a sixth signal produced by the interferometer array corresponding to angle of arrival (AOA) from the emitter to produce a true emitter azimuth indicator.

* * * * *